United States Patent [19]

Masuda et al.

[11] Patent Number: 4,610,930

[45] Date of Patent: Sep. 9, 1986

[54] MAGNETIC RECORDING MEDIUM AND PROCESS FOR PRODUCING THE SAME

[75] Inventors: Toshiyuki Masuda; Nobuyuki Yamamoto, both of Shizuoka, Japan

[73] Assignee: Fuji Photo Film Co., Ltd., Kanagawa, Japan

[21] Appl. No.: 714,068

[22] Filed: Mar. 21, 1985

Related U.S. Application Data

[63] Continuation of Ser. No. 382,746, May 27, 1982, abandoned.

[30] Foreign Application Priority Data

Jun. 30, 1981 [JP] Japan ............................... 56-100421

[51] Int. Cl.$^4$ ............................................. B32B 27/38
[52] U.S. Cl. .................... 428/694; 428/695; 428/900; 427/131; 427/132
[58] Field of Search ............... 428/694, 695, 900, 928, 428/336; 204/192 M, 192 N; 427/130, 131, 132

[56] References Cited

U.S. PATENT DOCUMENTS 4,123,575 10/1978 Wesch et al. ...................... 428/414
4,298,656 11/1981 Mendelsohn ...................... 428/414
4,309,482 1/1982 Suzuki et al. ...................... 428/900

OTHER PUBLICATIONS

W. G. Potter, *Epoxide Resins*, pp. 63-64, London ILIFFE Books, 1970.

Primary Examiner—Norman Morgenstern
Assistant Examiner—K. Jaconetty
Attorney, Agent, or Firm—Sughrue, Mion, Zinn, Macpeak and Seas

[57] ABSTRACT

A magnetic recording medium having a thin magnetic recording metal film formed on one surface of a non-magnetic base is disclosed. A thin cured epoxy resin film comprising an epoxy resin having an epoxy equivalent of from 400 to 3,000 and a curing agent made of an aliphatic amine having two or more amino groups and three or more amino active hydrogen atoms in the molecular chain is formed on either the thin magnetic metal film or the surface of the non-magnetic base opposite the thin magnetic metal film or both. A process for producing such magnetic recording medium is also disclosed.

7 Claims, No Drawings

MAGNETIC RECORDING MEDIUM AND PROCESS FOR PRODUCING THE SAME

This is a continuation of application Ser. No. 382,746 filed May 27, 1982, now abandoned.

FIELD OF THE INVENTION

The present invention relates to a magnetic recording medium comprising a thin magnetic film as a magnetic recording layer and to a process for producing the same, more particularly, to a magnetic recording medium of the thin metal film type having good running property, wear resistance and electro-to-magnetic conversion characteristics and to a process for producing the same.

BACKGROUND OF THE INVENTION

Most conventional magnetic recording media are of the coated type which are produced by dispersing particles of magnetic oxides or ferromagnetic alloys, such as $\gamma\text{-}Fe_2O_3$, Co-doped $\gamma Fe_2O_3$, $Fe_3O_4$, Co-doped $Fe_3O_4$, a Berthollide compound of $\gamma\text{-}Fe_2O_3$ and $Fe_3O_4$ or $CrO_2$, in an organic binder, such as a vinyl chloride/vinyl acetate copolymer, a styrene/butadiene copolymer, an epoxy resin or a polyurethane resin, applying the resulting coating composition onto a non-magnetic base and drying the coating.

However, with the recent increasing demand for higher density recording, researchers' attention has been drawn to magnetic recording media of the thin metal film type that comprise a thin ferromagnetic metal film as a magnetic recording layer, the layer being formed by a vapor deposition technique such as vacuum deposition, sputtering or ion plating, or a plating technique such as electroplating or electroless plating. Various efforts are being made to use such recording medium on a commercial scale.

Most magnetic recording media of the coated type use a metal oxide with low saturation magnetization as a magnetic material, so attempts to achieve high density recording using a thinner magnetic recording medium results in a decreased signal output. However, with magnetic recording media of the thin metal film type, a very thin magnetic recording layer can be formed using a ferromagnetic metal having a higher saturation magnetization than with a magnetic oxide without using a non-magnetic material such as binder, and such thinness is advantageous to provide good electro-to-magnetic conversion characteristics. However, such thin metal film type magnetic recording media have their own problems:

(1) high friction against a magnetic head, guide poles or other transport means when run to record, reproduce or erase magnetic signals, i.e., the same wear easily;

(2) easily attacked by corrosive environments; and (3) the magnetic recording layer thereof may be damaged by impact during handling.

Some attempts have been made to solve these problems by forming a protective layer on a magnetic recording media of the thin metal film type. One such proposal is described in Japanese Patent Application (OPI) No. 75001/75 (the symbol OPI as used herein means as unexamined published Japanese Patent Application) wherein a thin lubricant layer is formed on the thin metal film. According to this proposal, the coefficient of friction between the magnetic head or guide poles and the thin metal film is reduced to provide a tape that runs consistently and which is unlikely to be abraded. However, these advantages are quickly lost if the tape is used repeatedly.

Another method is described in Japanese Patent Applications (OPI) Nos: 39708/78 and 40505/78 wherein a lubricant protective layer made of a metal or metal oxide is formed on the thin metal film; however, even in this case the effect of the protective layer does not last long and, as the tape is repeatedly used, the friction coefficient increases rapidly or the thin magnetic metal film breaks.

Still another method is described in Japanese Patent Application (OPI) No. 155010/79 wherein an overcoat of a high molecular weight film is formed on the metal film; however, if the overcoat is made of a vinylidene chloride/acrylic ester copolymer or some other known high-molecular weight substance, the resulting film thickness is at least about 0.2 $\mu$m which causes spacing loss which, in turn, reads to reduced output in high density recording.

To achieve high density recording, most thin magnetic metal films are supported on a very smooth base, but no matter how smooth the base surface is, none of the lubricating methods described above can provide a magnetic recording medium having good running property especially in very humid atmospheres, or high wear resistance.

SUMMARY OF THE INVENTION

Therefore, one object of the present invention is to provide a magnetic recording medium of the thin metal film type that has good running properties, wear resistance and electro-to-magnetic conversion characteristics.

Another object of the present invention is to provide a magnetic recording medium of the thin metal film type that retains good running properties and wear resistance for an extended period of time.

The present inventors have found that these objects of the present invention can be achieved by forming a thin cured epoxy resin film comprising the following epoxy resin and a curing agent on either the thin magnetic metal film or the surface of the non-magnetic base opposite the thin magnetic metal film or both: an epoxy resin having an epoxy equivalent of from 400 to 3,000 and a curing agent is an aliphatic amine having two or more amino groups and three or more amino active hydrogen atoms in its molecular chain.

The resulting magnetic recording medium has good electro-to-magnetic conversion characteristics, as well as good running properties, wear resistance and abrasion resistance, and, at the same time, these properties last for an extended period.

The present inventors have also found that better results are obtained by incorporating a lubricant in the thin epoxy resin film or forming a lubricant layer thereon.

DESCRIPTION OF THE PREFERRED EMBODIMENTS

The thin magnetic metal film used in the present invention can be formed by vapor deposition or plating; vapor deposition is preferred since it yields the desired thin metal film and involves simple manufacturing steps without effluent treatment. Vapor deposition is a process in which a substance or its compound is heated in a gaseous or vacuum enclosure until its vapor or ionized vapor condenses on the surface of a substrate, and among variations of this process are vacuum vapor deposition, sputtering, ion plating and chemical vapor phase plating.

The magnetic recording layer used in the present invention is a thin film that is formed by vapor deposition or plating of a ferromagnetic metal such as iron, cobalt or nickel, or a ferromagnetic alloy such as Fe-Co, Fe-Ni, Co-Ni, Fe-Si, Fe-Rh, Co-P, Co-B, Co-Si, Co-V, Co-Y, Co-La, Co-Ce, Co-Pr, Co-Sm, Co-Pt, Co-Mn, Fe-Co-Ni, Co-Ni-P, Co-Ni-B, Co-Ni-Ag, Co-Ni-Na, Co-Ni-Ce, Co-Ni-Zn, Co-Ni-Cu, Co-Ni-W, Co-Ni-Re, or Co-Sm-Cu. The thickness of the layer as used in the magnetic recording medium is preferably in the range of from 0.05 to 2 μm, more preferably from 0.1 to 0.4 μm.

The most preferred epoxy resins for forming the thin film on either the thin magnetic metal film or the surface of the non-magnetic base opposite the metal film are condensates of bisphenol A and epichlorohydrin having the following basic structure:

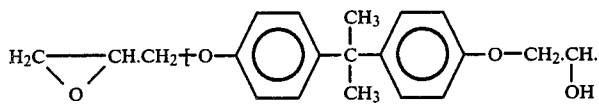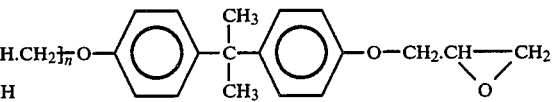

Other epoxy resins that can be used in the present invention include those of the halogenated bisphenol type, resorcin type, bisphenol F type, tetrahydroxyphenylethane type, novolak type, polyalcohol/polyglycol type, glycerin triether type, polyolefin type and bisphenol A type. These resins may be used alone or in combination.

The epoxy resin used in the present invention preferably has an epoxy equivalent of from 400 to 3,000. An epoxy resin having an epoxy equivalent of less than 400 is liquid at ordinary temperatures, so the base having an epoxy resin layer formed on the thin magnetic metal film and/or on the base itself cannot be wound up before the resin layer is cured. An epoxy resin having an epoxy equivalent of more than 3,000 softens when a roll of the base having such a layer is heat cured, and blocking occurs at the interface between the epoxy layer on the metal film or the epoxy layer on the base. This makes it difficult to produce a long tape.

The other main feature of the present invention is to incorporate a curing agent in the epoxy resin to cure the same and form an insoluble and infusible resin layer. The curing agent is an aliphatic amine containing two or more amino groups and three or more amino active hydrogen atoms in its molecular chain. An aliphatic amine containing three or four amino groups and three or more amino active hydrogen atoms is preferred. Examples of such preferred amines are diethylenetriamine, N-aminoethylpiperazine, triethylenetetramine, dipropylenetriamine, tri(1,2-propylene)tetramine and bis(hexamethylene)triamine. Aliphatic amines having a molecular weight of more than 150 such as diethylenetriamine, N-aminoethylpiperazine, triethylenetetramine and dipropylenetriamine are particularly preferred. These amines may be used either alone or in combination. The desired curing speed for a protective resin layer having adequate strength cannot be obtained with amines other than those mentioned above.

The resin protective layer may contain 0.2 to 30 wt%, based on the resin, of a polymer such as a cellulose derivative, polyurethane or vinyl polymer to modify the physical properties of the surface of the resin layer. If more than 30 wt% of the polymer is used, one of the objects of the present invention, i.e. good tape wear resistance, is not effectively obtained.

The objects of the present invention can be achieved more effectively by incorporating a lubricant in the resin layer or forming a lubricant layer on the resin layer. Suitable lubricants are aliphatic acids, metal soaps, aliphatic acid amides, aliphatic acid esters, mineral oils, animal oils such as whale oil, vegetable oils, higher alcohols, and silicone oils; electrically conducting fine particulate materials such as graphite; inorganic fine particulate materials such as molybdenum disulfide, and tungsten disulfide; fine particles of plastics such as polyethylene, polypropylene, polyethylene/vinyl chloride copolymers and polytetrafluoroethylene; α-olefin polymers; unsaturated aliphatic hydrocarbons that are liquid at ordinary temperatures (i.e. those compounds having an n-olefin double bond attached to a terminal carbon atom), fluorocarbons and mixtures thereof.

Aliphatic acids, metal soaps, aliphatic acid amides, aliphatic acid esters, higher alcohols and mixtures thereof are preferred, and aliphatic acids having 10 or more carbon atoms are particularly preferred. Great improvement in running properties and abrasion resistance are achieved by using an aliphatic acid having 10 or more carbon atoms.

In addition to the lubricant, a corrosion inhibitor or a mold inhibitor which is well known in the art may be used as desired.

A thin epoxy resin film can be formed on either the thin magnetic metal film or the non-magnetic base, or both by any suitable method, for example, by applying a solution of the epoxy resin and curing agent in an organic solvent onto the metal film and/or base and drying the same, or by applying a solution of the epoxy resin in an organic solvent and a solution of the curing agent in an organic solvent, one on the other, and drying the respective coatings.

To compensate for evaporation during the subsequent drying step or to modify the physical properties of the resin layer, the amount of the curing agent added may be varied, but, preferably, it is used in an amount that satisfies the following relation:

$$0.5 \times \frac{100 \cdot a}{x \cdot E} \leq y \leq 1.5 \times \frac{100 \cdot a}{x \cdot E}$$

wherein
y: the amount of curing agent amine (g) per 100 g of the epoxy resin;
a: the molecular weight of the curing agent amine;
x: the number of amino active hydrogen atoms in the curing agent amine;
E: the epoxy equivalent of the epoxy resin.

If the curing agent is used in an amount of less than the lower limit, curing sufficient to provide a satisfactory protective layer is not achieved, while if it is used in an amount exceeding the upper limit, excess amine is emitted into air during the curing step or free amine will remain in the resin layer.

The concentration of the coating solution(s) is preferably in the range of from 0.05 to 5 wt%, and the solution is/are applied to the thin metal film and/or base in such an amount that the dry thickness of the film(s) is preferably in the range of from 5 to 1000 Å, more preferably from 10 to 500 Å, most preferably from 20 to 200 Å.

Examples of the organic solvent in which the epoxy resin and/or curing agent is/are dissolved include ketones such as acetone, methyl ethyl ketone, methyl isobutyl ketone, cyclohexanone and diacetone alcohol; esters such as methyl acetate, ethyl acetate, butyl acetate and glycol acetate monoethyl ether; glycol ethers such as glycol monoethyl ether and glycol monobutyl ether; aromatic hydrocarbons such as toluene and xylene; alcohols such as propanol and butanol; and chlorinated hydrocarbons such as methylene chloride and ethylene chloride.

The epoxy resin layer containing the curing agent is dried and cured at a temperature higher than 15° C., and the curing can be completed in a very short period by using a curing temperature higher than 30° C. The preferred curing temperature is higher than 30° C. and lower than the glass transition point of the base plus 30° C.

The lubricant can be incorporated in the epoxy resin layer or can be formed as a layer on the resin layer by any suitable method, for example, by applying a solution of the epoxy resin, curing agent and lubricant in an organic solvent as earlier exemplified onto the thin metal film and/or base; by first forming a dry thin layer of the epoxy resin and curing agent in the manner earlier described and then applying a solution of the lubricant in an organic solvent onto the resin film; or by first forming a cured thin layer of epoxy resin and curing agent in the manner earlier described and then applying a solution of the lubricant in an organic solvent onto the resin film; or by any of the methods of vapor deposition described before.

Examples of the solvent used for application of the lubricant layer include ketones such as acetone, methyl ethyl ketone, methyl isobutyl ketone and cyclohexanone; alcohols having 1 to 10 carbon atoms such as methanol, ethanol, propanol and butanol; esters such as methyl acetate, ethyl acetate, butyl acetate, ethyl lactate, and glycol acetate monoethyl ether; ether and glycol ethers such as glycol dimethyl ether, glycol monoethyl ether and dioxane; hydrocarbons such as pentane, hexane, heptane, octane, nonane and decane; tars (aromatic hydrocarbons) such as benzene, toluene and xylene; chlorinated hydrocarbons such as methylene chloride, ethylene chloride, carbon tetrachloride, chloroform, ethylene chlorohydrin and dichlorobenzene.

The lubricant is generally used in a dry weight of from 2 to 100 mg/m$^2$, preferably from 2 to 50 mg/m$^2$, more preferably from 2 to 20 mg/m$^2$ whether in layer form alone or in the epoxy layer. If the amount of the lubricant is less than 2 mg/m$^2$, the desired consistent tape running is not obtained, while if the amount is more than 100 mg/m$^2$, it fouls the magnetic head or guide poles on the video deck.

The recording medium of the present invention provides the following advantages:

(1) When it is used on a tape deck, it undergoes only a small increase in dynamic friction coefficient. This means the medium is stable to repeated running and has very high wear resistance;

(2) It retains high stability to repeated running even when it has a very smooth thin magnetic metal film and base;

(3) It has a low dynamic friction coefficient and runs smoothly in humid atmospheres;

(4) The epoxy resin layer does not reduce the electro-to-magnetic conversion characteristics of the magnetic recording medium of thin metal film type in which it is used; and (5) The epoxy resin layer is not substantially susceptible to corrosive attack in humid conditions and causes no reduction in the electro-to-magnetic conversion characteristics.

The present invention will now be described in greater detail by reference to the following example and comparative examples which are given here for illustrative purposes only and are by no means intended to limit the scope of the invention. In the example and comparative examples, all parts are by weight.

EXAMPLE 1

A magnetic cobalt film (0.2 μm thick) was formed on a polyethylene terephthalate film (20 μm thick). Electron beams were used to condense vapor of cobalt (99.95% purity) which was directed onto the PET film at an angle of incidence of 70° at a pressure of $5 \times 10^{-5}$ Torr. A polymer coating solution I of the formulation indicated below was applied onto both the Co film and the base film, each layer thereof having a dry thickness of 100 Å. The thus coated web was wound up into a roll, cured at 23° C. for 40 hours and heated at 80° C. for 24 hours to provide magnetic tape A.

Polymer Coating Solution I

Epoxy resin (of bisphenol A/glycidyl ether type with an epoxy equivalent of 450~500): 1.0 part
Diethylenetriamine: 0.05 part
Methylene chloride: 100.0 parts A lubricant coating solution II of the formulation indicated below was applied onto the cured epoxy resin film of the above magnetic tape A in a weight of 10 mg/m$^2$ and dried at 50° C. for 10 seconds. The dried film was slit into a video tape ½ inch wide which was referred to as Sample No. 1. The surface of the base opposite the Co film was referred to as Sample No. 1'.

Lubricant Coating Solution II

Myristic acid: 1.0 part
n-Hexane: 200 parts

EXAMPLE 2

A web was prepared as in Example 1 except that polymer coating solution I was replaced by polymer coating solution III of the formulation indicated below. The thus coated web was wound into a roll which was cured at 23° C. for 40 hours and heated at 80° C. for 24 hours to provide magnetic tape B. There was partial blocking at the interface of the epoxy layer on the thin metal film and the epoxy layer on the base. Lubricant coating solution II was applied on each epoxy resin coating in a same weight as in Example 1 and treated as in Example 1 to provide a video tape ½ inch wide which was referred to as Sample No. 2.

Polymer Coating Solution III

Epoxy resin (of bisphenol A/glycidyl ether type with an epoxy equivalent of 450~500): 1.0 part
Diethylenetriamine: 0.018 part Methylene chloride: 100 parts

COMPARATIVE EXAMPLE 1

A magnetic tape C was prepared as in Example 1 except that polymer coating solution I was replaced by polymer coating solution IV of the formulation indicated below. Blocking occurred in a fairly large area at the interface of the epoxy layer on the thin metal film and the epoxy layer on the base, and this made subsequent evaluation of the properties of the tape impossible.

Polymer Coating Solution IV

Epoxy resin (of bisphenol A/glycidyl ether type with an epoxy equivalent of 3300): 1.0 part
Diethylenetriamine: 0.008 part
Methylene chloride: 100 parts

COMPARATIVE EXAMPLE 2

A magnetic tape D was prepared as in Example 1 except that polymer coating solution I was replaced by polymer coating solution V of the formulation indicated below. Partial blocking occurred at the interface of the epoxy layer on the thin metal film and the epoxy layer on the base. Lubricant coating solution II was applied onto each epoxy resin coating in a same weight as in Example 1 and treated as in Example 1 to provide a video tape ½ inch wide which was referred to as Sample R-2.

Polymer Coating Solution V

Epoxy resin (of bisphenol A/glycidyl ether type with an epoxy equivalent of 450~500): 1.0 part
diethylaminopropylamine: 0.15 part
Methylene chloride: 100 parts

COMPARATIVE EXAMPLE 3

A magnetic tape E was prepared as in Example 1 except that polymer coating solution I was replaced by polymer coating solution VI of the formulation indicated below. Lubricant coating solution II was applied onto each epoxy resin coating in a same weight as in Example 1 and treated as in Example 1 to provide a video tape ½ inch wide which was referred to as Sample R-3.

Polymer Coating Solution VI

Vinylidene chloride/acrylic acid ester copolymer: 1.0 part
Methyl ethyl ketone: 200 parts

COMPARATIVE EXAMPLE 4

A video tape Sample R-4 was prepared as in Example 1 except that the Co magnetic film was simply formed on the PET base by oblique deposition without forming an epoxy resin film or lubricant layer. The base surface of the Sample R-4 was referred to as Sample R-4'.

All samples except for Sample No. 1' and R-4' wear subjected to the following film durability (were resistance) test and measurement of dynamic friction coefficient. For Sample No. 1' and R-4', only measurement of dynamic friction coefficient was conducted.

(1) Durability

Durability of a magnetic thin film was determined when pressing a magnetic tape against a magnetic head at a tension of 90 g/½ inch and reciprocating at 38 cm/sec 500 times. The number of visually observed abrasions that were formed on the tape surface was counted.

(2) Measurement of dynamic friction coefficient

The magnetic tape was reciprocated on a VHS video tape recorder Maclord 88, Model NV-8800; Matsushita Electric Industrial Co., Ltd.) once, 20 times, 100 times and 500 times, and the change in the dynamic friction coefficient ($\mu$) was examined by the formula $T_2/T_1 = e^{\mu \pi}$ wherein $T_1$ was the tape tension at the supply side of the rotary cylinder and $T_2$ was the tape tension at the takeup side.

The results are shown in Table 1 below.

TABLE 1

| Sample No. | Sliding face | Polymer film | | Anti-blocking** | Lubricant | (1) Abrasions after 500 reciprocations | (2) Change in dynamic friction coefficient | | | |
|---|---|---|---|---|---|---|---|---|---|---|
| | | | | | | | 1 (recip.) | 20 | 100 | 500 |
| No. 1 | Magnetic surface | Epoxy (450~500*): Diethylenetriamine: | 1 part 0.05 part | o | Myristic acid | No abrasion | 0.28 | 0.31 | 0.32 | 0.33 |
| No. 1' | Base surface | Epoxy (450~500*): Diethylenetriamine: | — | o | " | — | 0.29 | 0.30 | 0.31 | 0.34 |
| No. 2 | Magnetic surface | Epoxy (450~500*): Diethylenetriamine: | 1 part 0.018 part | Δ | " | 2 or 3 shallow abrasions | 0.30 | 0.34 | 0.37 | 0.44 |
| C | — | Epoxy (3300*): Diethylenetriamine: | 1 part 0.008 part | x | — | — | — | — | — | — |
| R-2 | Magnetic surface | Epoxy (450~500*) Diethylaminopropylamine: | 1 part 0.15 part | Δ | " | 4 or 5 shallow abrasions | 0.30 | 0.36 | 0.39 | 0.47 |
| R-3 | Magnetic surface | Vinylidene chloride/acrylic acid ester copolymer | — | — | " | 4 or 5 shallow abrasions | 0.31 | 0.38 | 0.42 | 0.50 |
| R-4 | Magnetic surface | — | — | — | — | More than 10 deep abrasions | 0.48 | 0.55 | 0.58 | 0.67 |
| R-4' | Base surface | — | — | — | — | — | 0.35 | 0.40 | 0.57 | 0.59 |

*epoxy equivalent of epoxy resin
**evaluation of antiblocking
o . . . no blocking
Δ . . . partial blocking
x . . . blocking in a wide area As the data in Table 1 show, the magnetic recording medium of the thin metal film type according to the present invention has very good running properties and wear resistance. Furthermore, the improvement in these properties is retained for an extended period of time. For this reason, the medium is a product having high commercial value.

While the invention has been described in detail and with reference to specific embodiments thereof, it will be apparent to one skilled in the art that various changes and modifications can be made therein without departing from the spirit and scope thereof.

What is claimed is:

1. A magnetic recording medium having a thin magnetic recording metal film formed on one surface of a non-magnetic base, a thin cured epoxy resin film comprising an epoxy resin and a curing agent being formed on either the thin magnetic metal film or the surface of the non-magnetic base opposite the thin magnetic metal film or both, said epoxy resin having an epoxy equivalent of from 400 to 3,000 and said curing agent being an aliphatic amine having two or more amino groups and three or more amino active hydrogen atoms in the molecular chain wherein the curing agent is contained in the epoxy resin in the amount that satisfies the following relation:

$$0.5 \times \frac{100 \cdot a}{x \cdot E} \leq y \leq 1.5 \times \frac{100 \cdot a}{x \cdot E}$$

wherein
- y: the amount of the curing agent amine (g) per 100 g of the epoxy resin;
- a: the molecular weight of the curing agent amine;
- x: the number of amino active hydrogen atoms in the curing agent amine;
- E: the epoxy equivalent of the epoxy resin.

2. A magnetic recording medium according to claim 1, wherein the thin cured epoxy resin film contains a lubricant or has a lubricant layer thereon.

3. A magnetic recording medium according to claim 1, wherein the curing agent is an aliphatic amine having a molecular weight of less than 150, three or four amino groups in the molecular chain and three or more amino active hydrogen atoms in the molecular chain thereof.

4. A magnetic recording medium according to claim 2, wherein the lubricant is an aliphatic acid having 10 or more carbon atoms.

5. A process for producing the magnetic recording medium of claim 1 wherein the thin cured epoxy resin film is made by heating the non-magnetic base having the epoxy resin film in uncured form thereon at a temperature higher than 30° C. but lower than the glass transition point of the non-magnetic base plus 30° C.

6. A magnetic recording medium according to claim 1 wherein said cured epoxy resin film having been cured by heating at a temperature higher than 15° C.

7. A process for producing the magnetic recording medium of claim 2, wherein the thin cured epoxy resin film is made by heating the non-magnetic base having the epoxy resin film in uncured form thereon at a temperature higher than 30° C. but lower than the glass transition point of the non-magnetic base plus 30° C.

* * * * *